April 20, 1926. 1,581,903
W. L. WRIGHT
ICE CREAM CONTAINER FILLING MACHINE
Filed May 7, 1923 2 Sheets-Sheet 1

April 20, 1926.
W. L. WRIGHT
1,581,903
ICE CREAM CONTAINER FILLING MACHINE
Filed May 7, 1923   2 Sheets-Sheet 2
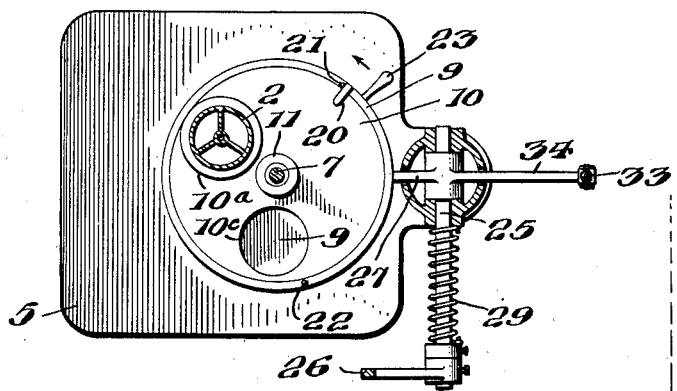
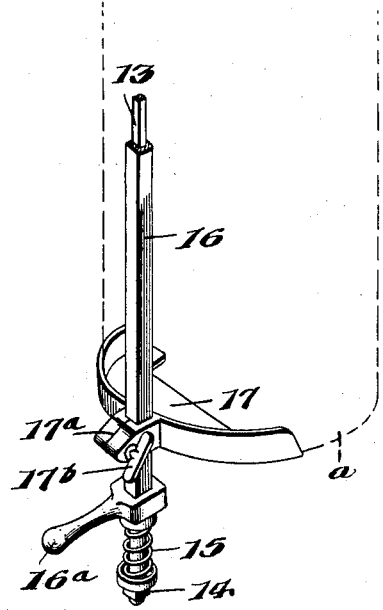
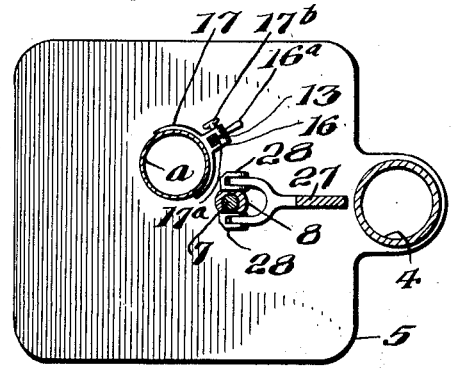
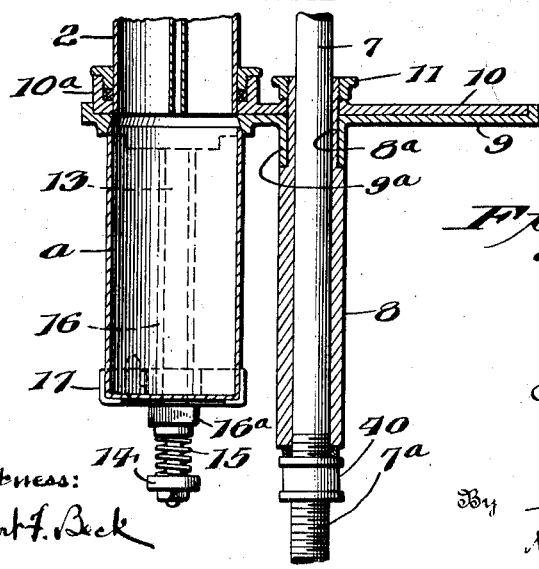

Patented Apr. 20, 1926.

1,581,903

UNITED STATES PATENT OFFICE.

WILBUR L. WRIGHT, OF FULTON, NEW YORK, ASSIGNOR TO OSWEGO FALLS CORPORATION, OF FULTON, NEW YORK, A CORPORATION OF NEW YORK.

ICE-CREAM-CONTAINER-FILLING MACHINE.

Application filed May 7, 1923. Serial No. 637,345.

*To all whom it may concern:*

Be it known that I, WILBUR L. WRIGHT, a citizen of the United States of America, and resident of Fulton, county of Oswego, State of New York, have invented certain new and useful Improvements in and Relating to Ice-Cream-Container-Filling Machines, of which the following is a specification.

This invention relates to machinery for filling containers with ice cream and other semi-frozen flowable products, and the objects and nature of the invention will be readily understood by those skilled in the art in the light of the following explanations of the accompanying drawings illustrating what I now believe to be the preferred mechanical expression or embodiment of my invention from among other forms, constructions and arrangements within the spirit and scope thereof.

An object of the invention is to provide an improved ice cream container filling machine that will be simple in construction and operation and peculiarly adapted for hand operation and manipulation by a single operator.

With this and other objects in view my invention consists in certain novel features in construction, arrangement, and in combinations as more fully and particularly set forth and specified hereinafter.

Referring to the accompanying drawings:

Fig. 2 is a cross section on the line 2—2, Fig. 1.

Fig. 3 is a cross section on the line 3—3, Fig. 1.

Fig. 4 is a detail vertical section through the container carrying turret, and the lower portion of the filling nozzle, and through a paper container in the turret and in longitudinal alinement with the nozzle.

Fig. 5 is a detail perspective of the container holder being from the turret, dotted lines indicating a container.

Figure 1:
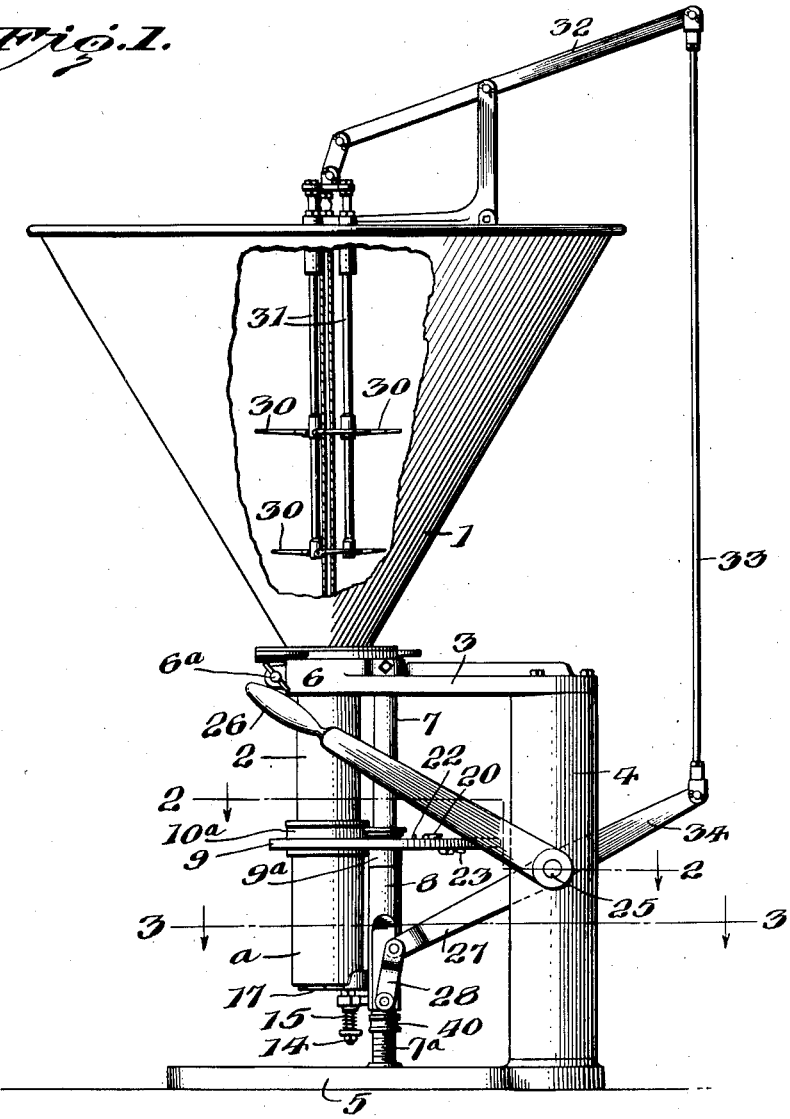
Fig. 1 shows an embodiment of the invention in side elevation, the storage funnel or hopper being partially broken away.

The machine, of the example illustrated, embodies a vertical storage funnel or downwardly-tapering hopper 1 for the semi-frozen flowable ice cream or the like, and this funnel terminates at the bottom or lower end with or in a depending vertical filling nozzle 2 alined with the vertical axis of the funnel and forming a central downward continuation of the interior thereof. The nozzle 2, is secured to and preferably forms a part of the funnel so that the funnel and nozzle form a unitary structure for application to and removable from the machine.

The funnel-nozzle unit is removably supported and upheld by a bracket arm 3 fixed to and projecting forwardly from supporting post 4 fixed to base 5. The front end of arm 3 is provided with a horizontal clamp 6 (having clamping screw $6^a$) that surrounds and removably grips the upper end of the nozzle so that the nozzle depends from the arm and the funnel is arranged above the arm. The arm 3 is arranged to uphold the funnel-nozzle unit with open lower end of the nozzle a distance above base plate 5 to permit the location of the container and the turret above the base and the desired operation of the turret and container with respect to the open discharge end of the nozzle.

A stationary vertical guide rod 7 is spaced rearwardly from and parallel with the nozzle 2, and extends from base 5 to arm 3 and at its ends is secured thereto.

The container carrying turret is carried by this rod 7, and, in this example, comprises an elongated slide in the form of a tube or sleeve 8, embracing and slidable vertically on said rod.

The upper end of this sleeve is externally reduced to form a supporting annular shoulder and a bearing spindle or axis $8^a$, for the vertical center hub $9^a$, of the rotary disk 9 of the turret.

The top head or cover disk 10 of the turret is formed with a center vertical bore that receives the upper end portion of the axis $8^a$ of the slide sleeve 8, and a nut 11 threaded on the upper end of the axis $8^a$, confines the cover disk 10 and the rotary disk 9, together and on the sleeve.

The rotary disk 9, is formed with a vertical opening extending completely therethrough at a point near, yet within the circle of, its circumference, and this opening is preferably flared or enlarged downwardly to form the upwardly tapered mouth $9^b$, to receive the top edge of the open top paper or other suitable container a, that is to be filled with ice cream or other semi-frozen product. The non-rotary cover disk 10, is formed with a vertical opening, between its rim and center, that receives the nozzle 2 and this opening preferably forms a slide sleeve 10ª, embodying packing and a gland surrounding and slidable vertically on the nozzle and preferably fitting the same to reduce liquid and air leakage to the minimum.

In the example illustrated, the oscillatory disk 9, is provided with a single container centering and filling opening 9ᵇ that is adapted to be brought into registration with sleeve 10ª and the open end of the nozzle while the remaining portion of disk 9 that is arranged to move under the open end of the nozzle, is imperforate to close said open end of the nozzle and serve to uphold the ice cream therein.

The disk 9 is provided with means to carry a container a, and clamp the same against the disk and fitting filling opening 9ᵇ, and in this instance, such means embodies a rod 13, fixed to and depending from disk 9 and at its lower end provided with spring stop or abutment 14 on which is seated coiled expansion spring 15 surrounding the lower end of the rod. A slide in the form of sleeve 16 surrounds and is movable vertically on the rod and at its lower end is seated on said spring. This sleeve carries the container supporting shelf or ledge 17 which is normally fixed to and projects laterally from the sleeve. The container shelf or supporting member 17, is secured to sleeve 16 through the medium of clamp 17ª projecting rearwardly from the shelf and embracing the sleeve and normally tightly clamping the same by means of tightening or clamp screw 17ᵇ. When the screw is loosened the clamp and the shelf can be moved vertically on the sleeve to the desired position at which the shelf can be fixed with respect to the sleeve by tightening the clamp 17ª through the medium of the screw 17ᵇ, all without disturbing the sleeve 16 and its position with respect to the spring 15.

The sleeve 16 is provided with a laterally projecting handle 16ª, in this instance, shown fixed to the lower end portion of the sleeve below the container shelf 17.

To apply a container, the sleeve carrying the container shelf is depressed by downward pressure on the handle 16ª, and the container in a vertical position is seated on the shelf and pressed back to position therein and its open end is thereby brought into alinement with the filling opening in disk 9. When the pressure is removed from handle 16ª, spring 15 forces the shelf up and the top edge of the container is clamped against and centered by the beveled wall 9ᵇ of the filling opening. When the filled container is to be removed, the handle 16ª, is again depressed to lower the shelf and free the top edge of the container from the filling opening.

By means of the adjustment of the shelf on sleeve 16, the parts can be adjusted and set to operate on containers of different capacities.

The disk 9 is arranged to turn on the axis 8ª, to bring its filling opening and the container into filling position in alinement with the open end of the nozzle and the sleeve 10ª, that is always centered on the nozzle. When the parts are in this position, the turret is elevated to cause the sleeve 10ª, and the container following the same, to slide up on the exterior of the nozzle. The turret is thus moved up until the bottom end of the nozzle approximately meets the top surface of the container bottom, to approximately displace the air from the container. The turret is then allowed to descend to its limit of downward movement, and during this downward movement on the nozzle the semi-frozen ice cream or other product flows, from the hopper and nozzle to fill the container from the bottom up. The disk 9 of the turret is then rotated or turned on axis 8ª, to move the container horizontally across the open end of the nozzle to bring a closed part of the disk across the end of the nozzle to uphold the ice cream therein and to carry the filled container to an inspection and removal station.

The turret top or disk 10 covers the disk 9 and the container top except at filling and inspection stations or positions. The opening through disk 10 surrounded by sleeve 10ª, provides for the filling station. A vertical opening 10ᶜ through disk 10 and exposed and visible at the top of said disk provides for the inspection station. This opening 10ᶜ is usually of about the same diameter as the filling opening in disk 9ᵇ and is arranged in the path of movement of said filling opening, so that the inspection opening and the filling opening will be brought into registration. The inspection opening is arranged to one side of the nozzle at a point where the machine operator can from his normal position look down through said position and see the interior of the container and the contents thereof. For instance, in the example illustrated, the inspection opening is located one hundred and twenty degrees more or less from the filling position.

The filling and inspection stations or positions are furthermore deprived by a fixed stop 20 carried by the turret top or cover disk 10 and projecting radially over the rim of the rotary disk 9 and located between and in the path of movement of two stops 21, 22, fixed to and projecting up from the rim of the rotary disk. The stop 21 defines the filling position (Fig. 2) and the stop 22, the inspection position, and limit the rotary disk 9 to oscillation or rotation through an arc of about one hundred and twenty degrees. The rotary or oscillatory disk 9 is provided with a suitable handle 23, in this instance projecting from the edge thereof, by which the operator at the front of the machine, can oscillate the disk 9 back and forth the distance permitted by stops 21, 22, to carry the container to and from filling and inspection positions. If the container is to be filled without vertical sliding movement, thereof on the nozzle, by permitting the flowable product to drop into the container from the nozzle when nozzle and container are in alinement as in Fig. 4, the imperforate portion of the disk 9 can serve to cut off the flow from the nozzle when, the parts are not in filling position or adjustment, and even when the container is not telescoped into the nozzle for filling, it is necessary to inspect the container after leaving the filling position, to see that it contains full measure, before being removed from the machine for capping. Thus, if inspection at the inspection position discloses that the container is not full or properly charged, the container is not removed from the turret but the disk 9 is oscillated to bring the container again to the filling position, to complete the filling thereof. The containers are usually applied to and removed from the turret while at the inspection station.

Where the filling operation requires telescopic movement of the container on the nozzle as hereinbefore described, I provide mechanism for thus reciprocating the turret and container, and in the example illustrated, such mechanism comprises a horizontal rock shaft 25 at the rear of the machine and mounted in and carried by the post 4 and provided with an actuating handle lever 26 extending forwardly above the base and to one side of the turret and nozzle and accessible to the operator at the front of the machine so that the operator can swing the handle to rock the shaft and control the return movement thereof. The shaft is provided a lever arm 27, projecting forwardly under the turret disks and forked at its front end to straddle the sleeve 8 and pivotally coupled thereto by a pair of push and pull links 28, whereby the vertical position of the sleeve 8 is controlled by the shaft, arm 27, and links 28.

The arrangement is such that, in this instance, upward movement of the hand lever 26 carries the turret and container on the upward stroke and downward movement of the handle 26 corresponds with the downward filling movement of the container on the nozzle.

Suitable means usually act on the rock shaft 25 to approximately counterbalance the weight of the turret and parts carried thereby. For instance, I show coiled spring 29 for this purpose.

The machine illustrated herein is equipped with the internally divided funnel-nozzle unit, and the ice cream arch breaking mechanism of my patent application S. No. 577,373, filed July 25, 1922, all as set forth therein.

In Fig. 1, I show arch breakers 30, in the position assumed when moving downward in the semi-frozen masses of ice cream. These breakers are carried by vertically movable slides 31, actuated by and operatively connected to rocking lever 32. I actuate lever 32 through the medium of connecting rod 33, pivotally joined to the rear end of arm 34, fixed to and projecting rearwardly from rock shaft 25. Thus, in this example, when hand lever 26 moves upwardly, the slides 31 and breakers 30, will move upwardly, and when hand lever 26 moves down, the breakers are forced downwardly.

In the example illustrated, I provide a stop 40, that limits the downward movement of the turret, and determines the vertical position of said limit which bears a certain relation to the vertical plane in which the lower end of the nozzle 2 is located. This stop 40 is formed by an internally threaded nut adjustable vertically on the rod 7 through the medium of the longitudinally threaded portion 7ª, of said rod. By this arrangement, the stop 40 can be accurately adjusted vertically to take up wear and to maintain the downward limit of the turret at the required elevation.

It is evident that various changes, modifications and variations might be resorted to without departing from the spirit and scope of my invention and hence I do not wish to limit myself to the exact disclosures hereof.

What I claim is:—

1. A container filling machine, comprising a depending filling nozzle, and a container turret to cooperate therewith in filling containers therefrom and embodying a member having a mouth to register with said nozzle, and means to hold a container to said mouth to receive ice cream from said nozzle, said means comprising a fixed rod depending from said member, an expansion spring on said rod, a sleeve slidable vertically on said rod and normally seated on said spring, and having a handle and a container upholding shelf having a supporting clamp normally fixed on said sleeve but adjustable longitudinally thereof.

2. A container filling machine, comprising an upright post having a base and an elevated overhanging arm, an upright hopper-nozzle supported in elevated position by said base, a vertically movable container turret arranged to cooperate with said nozzle in filling containers therefrom, a counterbalanced transverse rock shaft carried by said post, and having a lever arm operatively connected to said turret to lift the same and control the vertical position thereof, said shaft having a forwardly extending actuating handle, agitating means within said hopper and carried thereby, and an operative connection therefrom to said rock shaft embodying a lever arm of said rock shaft.

3. A container filling machine, comprising a supporting frame, a hopper-nozzle unit upheld thereby with the nozzle depending therefrom, a vertically movable and horizontally-oscillatory container turret arranged to cooperate with said nozzle in filling containers therefrom and providing for inspection of the interior of the container while in the turret by an operator at the front of said machine, stops controlling the limits of oscillation of said turret, said turret providing an operating handle for causing said oscillatory movement, said handle accessible to one hand of the operator, and mechanism for causing said vertical turret movement embodying an actuating handle accessible to the other hand of the operator.

4. In combination, in a machine for filling containers with ice cream and the like, a stand comprising a base, an upright post fixed thereto and provided with a lateral elevated relatively fixed arm, a normally-fixed vertical guide rod connecting the base and the arm; a hopper-nozzle unit supported by said arm in a normally-fixed elevated upright position and embodying a storage hopper and a vertical discharge nozzle depending from said arm beside and spaced from said rod; and a container carrier comprising a sleeve slidable vertically on said rod, and container-holding means to carry the container vertically on said nozzle; and means for vertically moving said carrier.

5. In a machine for filling containers with ice cream and the like, in combination, a base having an upright with an elevated forwardly extending arm and a relatively-fixed vertical guide rod from base to arm, a vertically adjustable stop above said base and on said rod; a normally fixed hopper-nozzle unit carried by said arm in upright elevated normally-fixed position and embodying a filling nozzle depending below the arm and spaced from said rod; a vertically-movable carrier for the containers to be filled embodying a slide vertically movable on and guided by said rod and limited in its downward movement by said stop, said carrier embodying means to removably hold a container and guide the same vertically onto and from the nozzle, and means for vertically moving said carrier, embodying a rock shaft and forwardly extending handle.

6. Apparatus for filling containers with ice cream and the like, comprising in combination, a supporting standard having an elevated lateral arm and a relatively fixed vertical guide rod; a hopper-nozzle unit supported in a relatively-fixed upright elevated position by said arm with the nozzle depending therefrom; a vertically movable container carrier having a sleeve guided by and vertically movable on said rod; and a transverse rock shaft carried by said standard and operatively coupled to said carrier to raise and lower the same, said shaft having a forwardly extending operating handle.

7. A container filling machine comprising a hopper-nozzle unit, a base, a post rising therefrom and having a forwardly extending arm to support said unit with the nozzle depending therefrom, a fixed vertical rod connecting the base and arm, and a container carrying turret centered on said rod and arranged to cooperate with said nozzle to fill the container therefrom.

In testimony whereof I have hereunto set my hand at Fulton, N. Y., May 4th, 1923.

WILBUR L. WRIGHT.